United States Patent
Jalali (10) Patent No.: US 9,479,964 B2
(45) Date of Patent: *Oct. 25, 2016

(54) METHODS AND APPARATUS FOR MITIGATING FADING IN A BROADBAND ACCESS SYSTEM USING DRONE/UAV PLATFORMS

(71) Applicant: Ubiqomm LLC, San Diego, CA (US)

(72) Inventor: Ahmad Jalali, Rancho Santa Fe, CA (US)

(73) Assignee: Ubiqomm LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,160

(22) Filed: Jun. 3, 2014

(65) Prior Publication Data
US 2015/0304885 A1     Oct. 22, 2015

Related U.S. Application Data (60) Provisional application No. 61/981,128, filed on Apr. 17, 2014.

(51) Int. Cl.
| | |
|---|---|
| H04W 28/04 | (2009.01) |
| H04B 7/185 | (2006.01) |
| B64C 39/00 | (2006.01) |
| H04L 1/00 | (2006.01) |

(Continued)

(52) U.S. Cl.
CPC .......... H04W 28/048 (2013.01); B64C 39/00 (2013.01); H04B 7/18504 (2013.01); H04L 1/00 (2013.01); H04L 5/00 (2013.01); H04W 52/04 (2013.01); H04W 52/241 (2013.01); H04W 52/143 (2013.01); H04W 74/00 (2013.01)

(58) Field of Classification Search
None
See application file for complete search history.

(56) References Cited

U.S. PATENT DOCUMENTS

| | | | |
|---|---|---|---|
| 3,780,303 | A | 12/1973 | Smith et al. |
| 4,209,695 | A | 6/1980 | Arnold et al. |

(Continued)

FOREIGN PATENT DOCUMENTS

| | | |
|---|---|---|
| CA | 2316440 A1 | 2/2001 |
| EP | 2369361 A1 | 9/2011 |

(Continued)

OTHER PUBLICATIONS

Goldsmith A.J., et al., "Design Challenges for Energy-Constrained Ad Hoc Wireless Networks," Wireless Communications, IEEE, 2002, vol. 9 (4), pp. 8-27.

*Primary Examiner* — Chi H Pham
*Assistant Examiner* — Soon-Dong D Hyun
(74) *Attorney, Agent, or Firm* — Gadzinski & Associates, PC (57) ABSTRACT

Systems and methods for mitigating the effects of atmospheric conditions such as rain, fog, cloud in a broadband access system using drone/UAVs. In one embodiment, terminal and drone radio and transmission medium fixture sub-systems comprise multiple transmission media. In one embodiment, in response to changes in atmospheric conditions the drone radio sub-system switches transmission medium to reduce the effects of atmospheric conditions. In another embodiment, the terminal and drone radio sub-systems equalize the data rates among terminals in response to changes in atmospheric conditions observed by different terminals. In another embodiment, the drone radio sub-system adjusts the transmit power on the downlink to different terminal according to fading due to atmospheric conditions on each link.

20 Claims, 8 Drawing Sheets

(51) Int. Cl.
    *H04L 5/00*         (2006.01)
    *H04W 52/04*      (2009.01)
    *H04W 52/24*      (2009.01)
    *H04W 74/00*      (2009.01)
    *H04W 52/14*      (2009.01)

(56) References Cited

U.S. PATENT DOCUMENTS

| | | |
|---|---|---|
| 4,278,885 A | 7/1981 | von Alfthan et al. |
| 4,317,993 A | 3/1982 | Hertzog, Jr. et al. |
| 4,365,154 A | 12/1982 | Arnold et al. |
| 4,387,302 A | 6/1983 | Givens |
| 4,499,380 A | 2/1985 | Aggour et al. |
| 4,851,687 A | 7/1989 | Ettinger et al. |
| 5,021,664 A | 6/1991 | Hinshaw |
| 5,068,532 A | 11/1991 | Wormald et al. |
| 5,076,993 A | 12/1991 | Sawa et al. |
| 5,098,640 A | 3/1992 | Gozani et al. |
| 5,239,568 A | 8/1993 | Grenier |
| 5,521,817 A | 5/1996 | Burdoin et al. |
| 5,712,885 A | 1/1998 | Sowerby et al. |
| 5,832,379 A | 11/1998 | Mallinckrodt |
| 6,018,659 A | 1/2000 | Ayyagari et al. |
| 6,034,634 A | 3/2000 | Karlsson et al. |
| 6,044,323 A | 3/2000 | Yee et al. |
| 6,061,562 A | 5/2000 | Martin et al. |
| 6,108,538 A | 8/2000 | Blasiak et al. |
| 6,144,032 A | 11/2000 | Gazdzinski |
| 6,256,476 B1 | 7/2001 | Beamish et al. |
| 6,513,758 B1 | 2/2003 | Lloyd |
| 6,628,941 B2 | 9/2003 | Knoblach et al. |
| 6,718,161 B1 | 4/2004 | Westall et al. |
| 6,756,937 B1 | 6/2004 | Chang et al. |
| 6,856,803 B1 | 2/2005 | Gross et al. |
| 7,095,376 B1 | 8/2006 | Timothy |
| 7,212,170 B1 | 5/2007 | Dean et al |
| 7,777,674 B1 | 8/2010 | Haddadin et al. |
| 8,078,162 B2 | 12/2011 | Deaton et al. |
| 8,116,763 B1 | 2/2012 | Olsen |
| 8,183,999 B1 | 5/2012 | Giallorenzi et al. |
| 8,190,147 B2 | 5/2012 | Kauffman et al. |
| 8,558,734 B1 | 10/2013 | Piesinger |
| 8,897,770 B1 | 11/2014 | Frolov et al. |
| 9,100,086 B1 | 8/2015 | Olsen |
| 9,119,179 B1 | 8/2015 | Firoiu et al. |
| 2002/0061730 A1 | 5/2002 | Hart |
| 2002/0168974 A1 | 11/2002 | Rosen et al. |
| 2003/0040274 A1* | 2/2003 | Dai .................. H04B 7/18543 455/13.4 |
| 2003/0095067 A1 | 5/2003 | Howell |
| 2003/0223354 A1 | 12/2003 | Olszewski |
| 2004/0038658 A1 | 2/2004 | Gurelli |
| 2004/0152480 A1 | 8/2004 | Willars |
| 2005/0035897 A1 | 2/2005 | Perl et al. |
| 2005/0143005 A1 | 6/2005 | Moore, III |
| 2005/0243005 A1 | 11/2005 | Rafi |
| 2005/0264438 A1 | 12/2005 | Fullerton et al. |
| 2006/0009262 A1 | 1/2006 | Hamm |
| 2006/0063566 A1 | 3/2006 | Maruta |
| 2006/0238411 A1 | 10/2006 | Fullerton et al. |
| 2007/0090990 A1 | 4/2007 | Nelson |
| 2007/0184849 A1 | 8/2007 | Zheng |
| 2007/0230419 A1 | 10/2007 | Raman et al. |
| 2008/0090606 A1 | 4/2008 | Hwang et al. |
| 2008/0233865 A1 | 9/2008 | Malarky et al. |
| 2009/0092072 A1* | 4/2009 | Imamura ............ H04B 7/15542 370/315 |
| 2009/0209277 A1 | 8/2009 | Pinchas et al. |
| 2009/0219912 A1* | 9/2009 | Wengerter ......... H04L 12/5693 370/345 |
| 2009/0295485 A1 | 12/2009 | Mitchell |
| 2010/0085236 A1 | 4/2010 | Franceschini et al. |
| 2010/0172299 A1 | 7/2010 | Fischer |
| 2010/0224732 A1 | 9/2010 | Olson et al. |
| 2010/0273504 A1 | 10/2010 | Bull |
| 2010/0284377 A1 | 11/2010 | Wei |
| 2010/0290412 A1* | 11/2010 | Ahn ..................... H04L 1/0028 370/329 |
| 2011/0032149 A1 | 2/2011 | Leabman |
| 2011/0103293 A1 | 5/2011 | Gale et al. |
| 2011/0122024 A1 | 5/2011 | Eidloth et al. |
| 2011/0142150 A1 | 6/2011 | Anigstein et al. |
| 2011/0182230 A1 | 7/2011 | Ohm et al. |
| 2011/0286325 A1 | 11/2011 | Jalali et al. |
| 2011/0286372 A1 | 11/2011 | Taghavi |
| 2012/0052828 A1 | 3/2012 | Kamel et al. |
| 2012/0202430 A1 | 8/2012 | Jalali |
| 2012/0235863 A1 | 9/2012 | Erdos et al. |
| 2013/0070677 A1 | 3/2013 | Chang |
| 2013/0155847 A1 | 6/2013 | Li et al. |
| 2013/0156021 A1 | 6/2013 | Ashikhmin et al. |
| 2013/0303080 A1* | 11/2013 | Moreno ................ H04J 11/004 455/9 |
| 2013/0321204 A1 | 12/2013 | Zahavi et al. |
| 2013/0331026 A1 | 12/2013 | O'Neill et al. |
| 2014/0003302 A1 | 1/2014 | Han et al. |
| 2014/0003394 A1 | 1/2014 | Rubin et al. |
| 2014/0049643 A1 | 2/2014 | Segerstrom et al. |
| 2014/0073337 A1 | 3/2014 | Hong et al. |
| 2014/0105054 A1 | 4/2014 | Sägrov et al. |
| 2014/0139372 A1 | 5/2014 | Seol et al. |
| 2014/0241239 A1* | 8/2014 | Chang ................ H04B 7/18506 370/316 |
| 2014/0335817 A1* | 11/2014 | Hyde ................... H04W 40/246 455/406 |
| 2014/0347223 A1 | 11/2014 | Hyde et al. |
| 2014/0348140 A1 | 11/2014 | Atkinson |
| 2015/0142966 A1* | 5/2015 | Baran ................. H04L 41/0826 709/224 |
| 2015/0236778 A1 | 8/2015 | Jalali |
| 2015/0236779 A1 | 8/2015 | Jalali |
| 2015/0236780 A1 | 8/2015 | Jalali |
| 2015/0236781 A1 | 8/2015 | Jalali |
| 2015/0237569 A1 | 8/2015 | Jalali |
| 2015/0280812 A1 | 10/2015 | Jalali |
| 2015/0362917 A1 | 12/2015 | Wang et al. |
| 2016/0088498 A1 | 3/2016 | Sharawi |

FOREIGN PATENT DOCUMENTS

| | | |
|---|---|---|
| EP | 2801838 A1 | 11/2014 |
| WO | WO-2014007873 A2 | 1/2014 |

\* cited by examiner

METHODS AND APPARATUS FOR MITIGATING FADING IN A BROADBAND ACCESS SYSTEM USING DRONE/UAV PLATFORMS

PRIORITY

This application claims priority to co-owned, co-pending U.S. Patent Provisional Application Ser. No. 61/981,128, filed on Apr. 17, 2014, and entitled "METHODS AND APPARATUS FOR MITIGATING FADING IN A BROADBAND ACCESS SYSTEM USING DRONE/UAV PLATFORMS", the foregoing being incorporated by reference herein in its entirety.

RELATED APPLICATIONS

The application is related to co-owned, co-pending U.S. patent application Ser. No. 14/222,497, and entitled "BROADBAND ACCESS TO MOBILE PLATFORMS USING DRONE/UAV", filed on Mar. 21, 2014, and co-owned, co-pending U.S. patent application Ser. No. 14/223,705 entitled "BROADBAND ACCESS SYSTEM VIA DRONE/UAV PLATFORMS", filed on Mar. 24, 2014, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes, among other things, aspects of a system for broadband internet access using drones as a platform to relay internet traffic among different types of terminals.

2. Description of Related Technology

As internet traffic has increased, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as FiOS (Fiber Optic Service), and geo-stationary satellite systems. The current broadband access systems have a number of short comings. One issue is lack of service in remote and/or lightly populated areas. Geo-stationary satellites do provide service in remote areas of the developed world such as the United States. Poorer areas of the world, however, lack adequate satellite capacity.

A notable reason satellite capacity has not been adequately provided in poor regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and the high cost of satellites, there may be significant insurance costs for the satellite and the launch. Therefore, broadband satellite systems and services are relatively costly and difficult to justify in poor regions of the world. It is also costly to deploy terrestrial systems such as fiber or microwave links in lightly populated regions. The small density of subscribers does not justify the deployment cost.

SUMMARY

The present disclosure describes, inter glia, systems and methods for broadband access to homes, enterprises, and mobile platforms (such as airplanes and vehicles) using a network of drones.

In a first aspect, a drone is disclosed. In one embodiment, the drone is configured to provide broadband access to one or more terminals, and includes: at least one transmission medium fixture comprising at least one transmission medium configured to provide coverage to one or more terminals; at least one radio sub-system configured to demodulate and decode one or more first signals received from the one or more terminals, and modulate and transmit one or more second signals to the one or more terminals; and a drone switching sub-system configured to switch data received at the drone to another receiving unit of the one or more terminals and/or the one or more drones.

In one variant, the one or more terminals comprise one or more ground-based mobile terminals. The drone radio sub-system is further configured to determine an amount of transmission resources to be allocated to one or more downlinks of the different ones of the one or more ground-based mobile terminals to equalize a data rate among the different ones of the one or more ground-based mobile terminals according to a fairness criterion. A scheduler is also included, the scheduler configured to schedule the determined amount of transmission resources to the downlink of the different ones of the one or more ground-based mobile terminals.

In another aspect, a method of providing broadband access using a plurality of drones is disclosed. In one embodiment, the method includes: measuring a signal quality metric; comparing the measured signal quality metric for one or more terminals of a plurality of terminals versus one or more threshold values; and determining if the signal quality metric of the one or more terminals has degraded due to one or more atmospheric conditions.

In one variant, the method further includes determining a number of transmission resources that an uplink and downlink to the one or more terminals needs in order to equalize the throughput to different ones of the plurality terminals according to a specified fairness criterion. In another variant, a scheduler is informed of the allocated number of transmission resources for each terminal link; and a message is sent to one or more terminals comprising respective uplink transmission resource allocations.

In another aspect, a mobile terminal is disclosed. In one embodiment, the terminal includes a mobile terminal radio sub-system comprising at least one transmission medium fixture configured for use with at least two transmission mediums. In one variant, the mobile terminal radio sub-system is configured to: demodulate and decode one or more first signals received on at least one transmission medium of the at least two transmission mediums from at least one of one or more drones; modulate and transmit the one or more first signals on the at least one transmission medium to the at least one of the one or more drones; and responsive to a switch instruction, the at least one transmission medium fixture switches to a different transmission medium of the at least two transmission mediums.

This disclosure describes systems and methods for mitigating rain, fog, cloud and other atmospheric effects for a drone based broadband access system to homes, enterprises, and mobile platforms. The system comprises one or more drones, each drone comprising at least one transmission medium fixture supporting at least one radio frequency or free space optics transmission medium configured to provide coverage to one or more ground/mobile terminals. Each drone comprises at least one radio sub-system configured to demodulate and decode one or more first signals received from the one or more ground/mobile terminals on at least one transmission medium. The drone radio sub-system is further configured to modulate and transmit one or more second signals to the one or more ground/mobile terminals on at least one transmission medium. Drone communications system further comprises a switching sub-system configured to switch data received at the drone to another receiving unit. Each ground/mobile terminal comprises systems and methods to demodulate and decode the one or more second signals received on at least one transmission medium from at least one of the one or more drones corresponding thereto; and to modulate and transmit the one or more first signals on at least one transmission medium to the at least one of the one or more drones.

One aspect of the disclosure comprises systems and methods for: the ground/mobile terminal radio sub-system to measure changes in received downlink signal quality due to rain, fog, cloud and other atmospheric conditions, and to send the measured signal quality to the drone radio sub-system; the drone radio sub-system to determine the amount of time that must be allocated to the downlinks of the different ground/mobile terminals to equalize the data rate among different terminals according to some fairness criterion; and the scheduler at the drone processor to schedule the determined number of time slots or bandwidth to the downlink of different ground/mobile terminals.

Another aspect of the disclosure comprises: a drone radio sub-system to determine changes on the uplink signal quality received from different ground/mobile terminals due to rain, fog, cloud and other atmospheric conditions; the drone radio sub-system to determine the amount of time that must be allocated to the uplink of the different ground/mobile terminals to equalize the data rate among different terminals according to some fairness criterion; and the scheduler at the drone processor to schedule the determined number of time slots or bandwidth to the uplink of different ground/mobile terminals.

Another aspect of the disclosure comprises systems and methods for the ground/mobile terminal radio sub-system to measure changes in received downlink signal quality due to rain, fog, cloud and other atmospheric conditions, and to send the measured signal quality to the drone radio sub-system; the drone radio sub-system to determine whether to switch to a different transmission medium on the downlink with less fading from atmospheric conditions, and to send the information on the new medium and the time to switch to the new downlink medium to the ground/mobile terminal; the drone radio sub-system to switch to the new medium on the downlink at the specified time; and a ground/mobile terminal to switch to the new medium on the downlink at the specified time.

The system further comprises systems and methods for: the drone radio sub-system to measure changes in received uplink signal quality due to rain, fog, cloud and other atmospheric conditions; the drone radio sub-system to determine whether to switch to a different transmission medium on the uplink with less fading due to atmospheric conditions, and to send the information on the new medium and the time to switch to the new uplink medium to the ground/mobile terminal; the drone radio sub-system to switch to the new medium on the uplink at the specified time; and the ground/mobile terminal to switch to the new medium on the uplink at the specified time.

Another aspect of the disclosure comprises systems and methods for: the ground/mobile terminal radio sub-system to measure changes in received downlink signal quality due to rain, fog, cloud and other atmospheric conditions, and to send the measured signal quality to the drone radio sub-system; the drone radio sub-system to determine changes in the amount of power allocated on the downlink to each ground/mobile terminal to equalize the data rate among different terminals according to some fairness criterion; and the drone radio sub-system to adjust the power allocated to downlink of each ground/mobile terminal.

The TX unit of the drone radio sub-system comprises systems and methods for: encoding each terminal's data and mapping the coded bits onto constellation symbols; scaling the coded symbols from each terminal destined to different antenna elements to form a beam toward the terminal; summing the scaled coded symbols from different terminals destined to the same antenna aperture to form multiple beams, one toward each terminal; amplifying and up-converting the summed signal to the appropriate frequency band; and transmitting the resulting signal through the corresponding antenna aperture. In another aspect of the disclosure, the drone TX unit comprises systems and methods to choose the scaling for coded symbols for each terminal to adjust the power sent to that terminal on the downlink.

These and other aspects shall become apparent when considered in light of the disclosure provided herein.

BRIEF DESCRIPTION OF THE DRAWINGS

In the following figures, similar components are identified using the same reference label. Multiple instances of the same component in a figure are distinguished by inserting a dash after the reference label and adding a second reference label.

All FIGS. © Copyright 2014 Ubiqomm, LLC All rights reserved.

DETAILED DESCRIPTION

Reference is now made to the drawings, wherein like numerals refer to like parts throughout.

In view of the challenges and hurdles in both expense and access to remote, poor or otherwise underserved regions, there exists a need for improved broadband access. Accordingly, a system that has much lower hardware cost, has much lower launch/deployment cost, and is more easily scalable is needed.

Until recently drones, also known as Unmanned Aerial Vehicles (UAVs), have been extensively used by military, as well as for some scientific applications such as weather information gathering. Commercial applications of drones/UAVs include package delivery systems, video gathering systems, and communications systems. This disclosure describes aspects of a communications system design that are optimized for using drones/UAVs as the communications platform. Since drones/UAVs have the capability to fly at much lower altitudes than satellites do, such drone systems have an exemplary benefit of not needing the expensive space qualification of the satellite systems. Furthermore, drones/UAVs also do not need the expensive launch systems of satellites. Since the drone/UAV hardware cost is relatively small compared to satellites, and there is less of a launch risk, then there is a reduced need for additional insurance costs. Principles of the present disclosure therefore provide high capacity drone/UAV based broadband communication systems. As such, the relatively low cost of the drone/UAV hardware and operation cost, and its high capacity result in a low cost broadband delivery system.

Another exemplary advantage of a drone/UAV system configured according to the present disclosure over satellite systems is the low communication signal delay achievable by the drone/UAV systems. For instance, geo-stationary satellites typically have a round trip communication signal delay from ground to the satellite and back to ground of about 0.5 seconds which significantly impacts the quality of services that require low round trip delays. Even high altitude drones/UAVs (e.g., altitudes of 25 kilometers), would typically have a round trip communication signal delay of about 2 milliseconds to terminals on the ground for distances up to 300 kilometers from the drone. Accordingly, the low delay of drone/UAV based system of the present disclosure may enable similar real time quality as compared to terrestrial broadband access systems.

Another exemplary advantage of drones (configured according to the present disclosure) is that the drones may be deployed one at a time in areas with radiuses of 300 km or less and immediately provide service within the drone's footprint. In contrast, satellite systems may need to cover a wide area before service may be provided (such as a large part of the CONUS (CONtinental US) in the case of geo-satellite systems, or most of the earth in the case of LEO (Low Earth Orbit) satellite systems). Therefore, drone based systems offer improved scalability when compared to satellite systems, as a network provider can send one drone and start service in its footprint, test the market acceptance of the service, and then send more drones in areas that need service. Furthermore, a network provider could deploy the drones in only areas of the country where there is a high demand for the service. In the remainder of this disclosure we use the term drone to refer to both drones and UAVs. In addition, it should be noted that principles of the present disclosure may be equally applied to other types of aerial vehicles. For example, blimps or balloons may be implemented alternatively, or in addition to, the drones as discussed herein, to provide the broadband access system. Additionally, while the disclosed embodiments are described with respect to UAVs, it should be appreciated by those of ordinary skill in the related arts that drones are by no means limited to aerial operation; drones may include watercraft, land-based vehicles, submersibles, and even spacecraft variants, such implementations being within the skill of an ordinary artisan, given the contents of the present disclosure.

Figure 1:
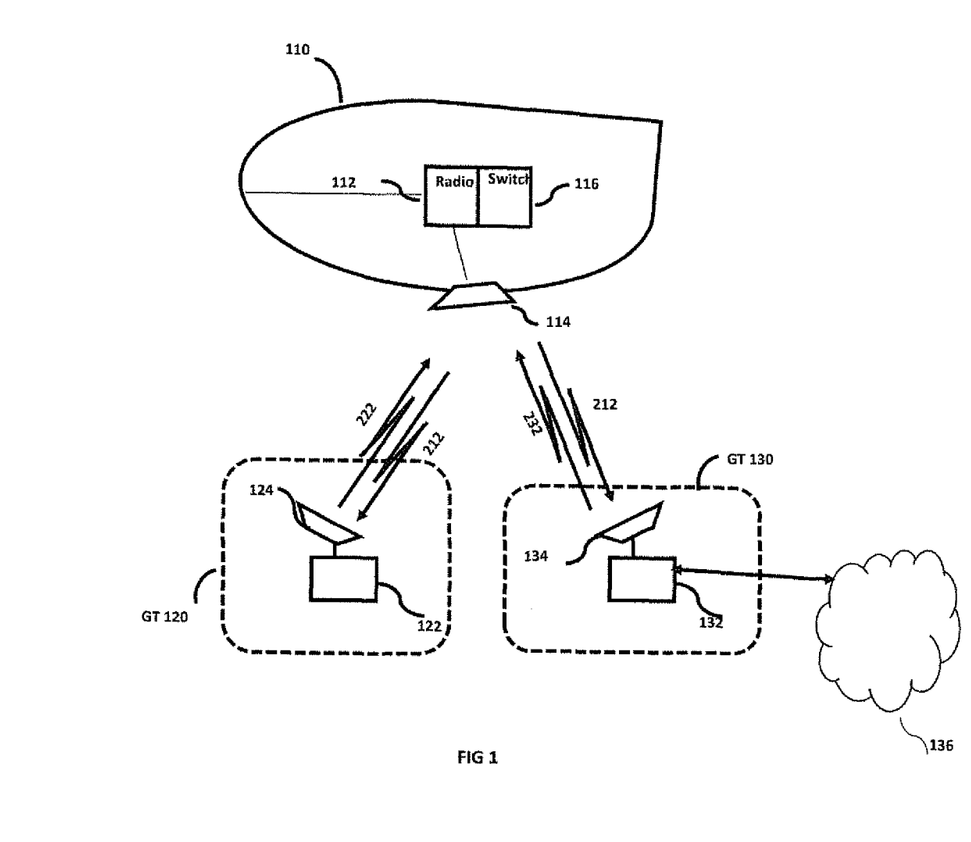
FIG. 1 is an exemplary block diagram of a drone/Unmanned Aerial Vehicle (UAV) based broadband access to internet system.
Figure 2A:
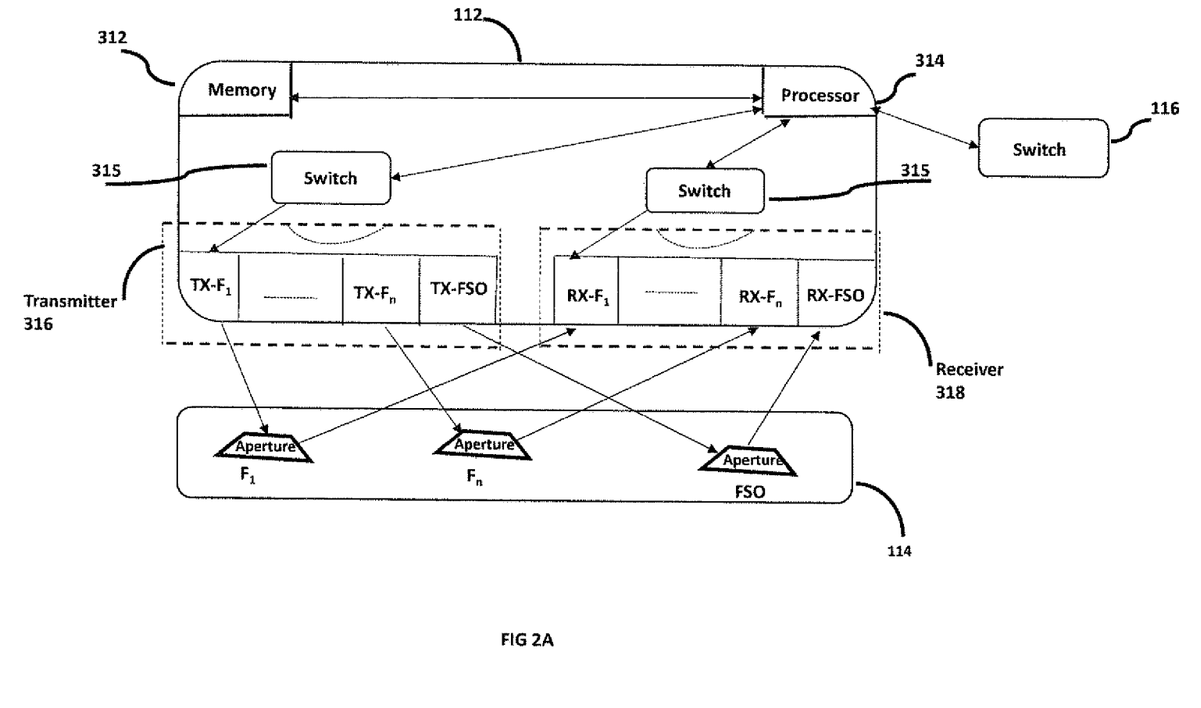
FIG. 2A-2B are block diagrams of exemplary drone and ground/mobile terminal radio sub-systems.

FIG. 1 illustrates one exemplary drone 110 configured according to the present disclosure. In one embodiment, each drone 110 has a drone radio sub-system 112 and at least one drone transmission medium fixture 114. The physical medium used to transmit the information may be electromagnetic waves (e.g., radio) in different frequency bands or Free Space Optics (FSO). The term "transmission medium aperture" refers to an antenna aperture when considering electromagnetic waves, and refers to an optical lens when considering FSO. Therefore, the aperture of the transmission medium fixture may be an antenna when using electromagnetic waves, or an optical aperture when using FSO. As shown in FIG. 2A, the drone radio sub-system 112 includes four (4) sub-systems: the receiver 318 that demodulates and decodes the signal received from an aperture of the transmission medium fixture 114; the transmitter sub-system 316 that modulates the data received from processor 314 and sends the resulting signal through an aperture of the transmission medium fixture 114; the processor sub-system 314 that carries out functions such as configuring the receiver 318 and transmitter 316 sub-systems, processing the data received from the receiver 318 sub-system, determining the data to be transmitted through the transmitter sub-system 316, as well as controlling the transmission medium fixture 114; and the memory sub-system 312 that contains program code and configuration, and system parameter information that are accessed by the processor 318.

As shown in FIG. 2A, the radio sub-system transmitter 316 and receiver 318 sub-systems support multiple frequency bands, $F_1 \ldots F_n$, as well as FSO, and each sub-system comprises multiple TX and RX units corresponding to each supported frequency band $F_1 \ldots F_n$ or FSO. As will be discussed below, the specific frequency band, $F_1 \ldots F_n$, or FSO, that is used for communication to a specific Ground Terminal (GT) depends on the relative distance of the GT to the drone, as well as the atmospheric conditions at a given time. As used herein, a "ground terminal" may refer to a fixed terminal or a terminal on a mobile platform such as a vehicle or an aircraft.

In one embodiment, a mechanism configured to connect the appropriate transmitter and receiver frequency or FSO units to the processor is disclosed. In one implementation, the radio sub-system 112 comprises a switching sub-system 315 that switches the data from processor 314 to the appropriate radio transmitter TX unit to modulate the data using the appropriate medium and to transmit the modulated signal through the corresponding medium aperture. Similarly, a switching sub-system 315 switches the data from the appropriate RX units of the receiver sub-system 318 to the processor sub-system 314. The transmission medium fixture 114 as shown in FIG. 2A includes a number of apertures supporting frequency bands F1 to Fn and FSO. The TX and RX units of the transmitter and receiver sub-systems are connected to the aperture corresponding to the same frequency band or FSO.

Depending on the altitude of the drone 110, each drone 110 may cover an area on the ground with a radius of tens of kilometers to hundreds of kilometers or more. In one exemplary embodiment, drones 110 are configured to communicate with at least three kinds of ground terminals: one type of terminal is the Ground Terminal (GT) 120 (see FIG. 1), such as terminals at home or enterprises to provide internet connectivity to a home or enterprise; a second type of terminal is installed on mobile platforms such as vehicles or airplanes; a third type is what is referred to as the internet Gateway (GTW) 130 which is connected to the internet. GTs 120 transmit and receive data from the internet using the drone network as an intermediary connection to network infrastructure. The drone's 110 radio sub-system 316 aggregates traffic received from the GTs 120 and may aggregate traffic received from multiple GTs 120 and send the aggregated data to the interne via one of the GTWs 130. Therefore, in one embodiment, the GTWs 130 provide higher data rates from/to drones than the data rates provided from the GTs 120. In these embodiments, the gain of the GTW medium aperture sub-system is larger than that of the GT 120, and the GTW 130 transmitter transmits at a higher power than the GTs 120.

As shown in FIG. 2A, drone 110 further comprises a drone switching sub-system 116. The switching sub-system 116 may route data received from one GT 120 to another GT 120 in the footprint of the drone, or from one GT 120 to a GTW 130 which is in turn connected to the internet 136.

Figure 2B:
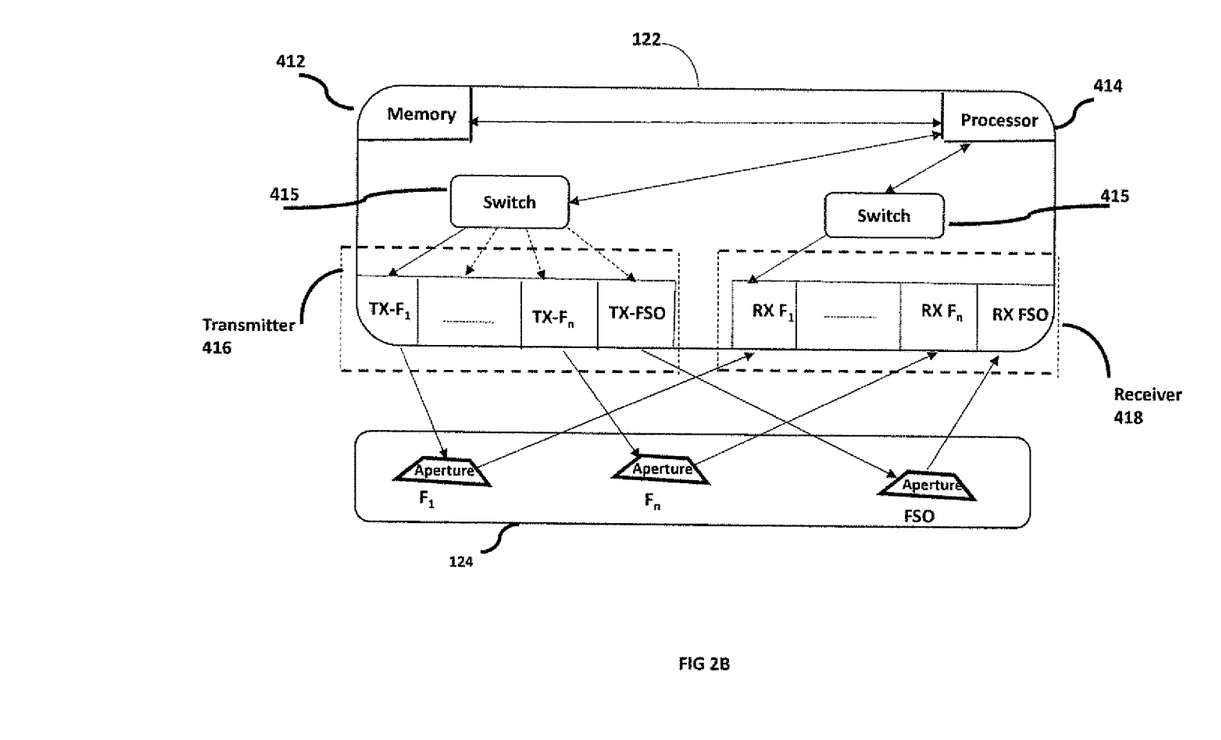

As shown in FIG. 2B, in one embodiment, the GT 120 is configured with two main sub-systems, a ground/mobile terminal radio sub-system 122, and a ground/mobile terminal transmission medium fixture 124. The GT radio sub-system 122 comprises four (4) sub-systems: the receiver 418 that demodulates and decodes the signal from drone medium aperture sub-system 124 the transmitter sub-system 416 modulates the data and sends the resulting signal through an aperture of the transmission medium fixture 124; the processor sub-system 414 is configured to execute software to perform various functions (such as configuring the receiver 418 and transmitter 416 sub-systems, processing the data received from the receiver sub-system 418, determining the data to be transmitted through the transmitter sub-system 416, as well as controlling the transmission medium fixture 124, etc.); and the memory sub-system 412 contains program code and configuration data, and system parameters information that are accessed by the processor 414. The switching sub-system 415 connects the processor to the appropriate transmitter or receiver units of the transmitter 416 and receiver 418 sub-systems.

The link between the drones and the GTs 120 may operate in different parts of the spectrum, $F_1 \ldots F_n$, or FSO. Since different parts of the spectrum are susceptible to atmospheric effects to different degrees, the range of the signal from the drone 110 to the ground terminals will depend on the particular frequency band being used. Frequencies above 10 GHz may suffer higher losses from rain fade than frequencies below 10 GHz; generally, higher frequencies incur higher fades. Frequencies above 10 GHz may also incur attenuation due to atmospheric gases such as oxygen and carbon dioxide ($CO_2$), as well as water vapor. Optical signals suffer primarily from fog and clouds.

In one embodiment of the present disclosure, a mechanism that detects and mitigates the effects of atmospheric losses is disclosed. In one variant, the disclosed mechanisms also optimize trade-offs between frequencies and ranges (e.g., higher frequencies have lower ranges). Specifically, different RF frequencies and optical links have different ranges, therefore the disclosed apparatus efficiently creates a wide coverage area using the different available frequency and optical bands.

Figure 3:
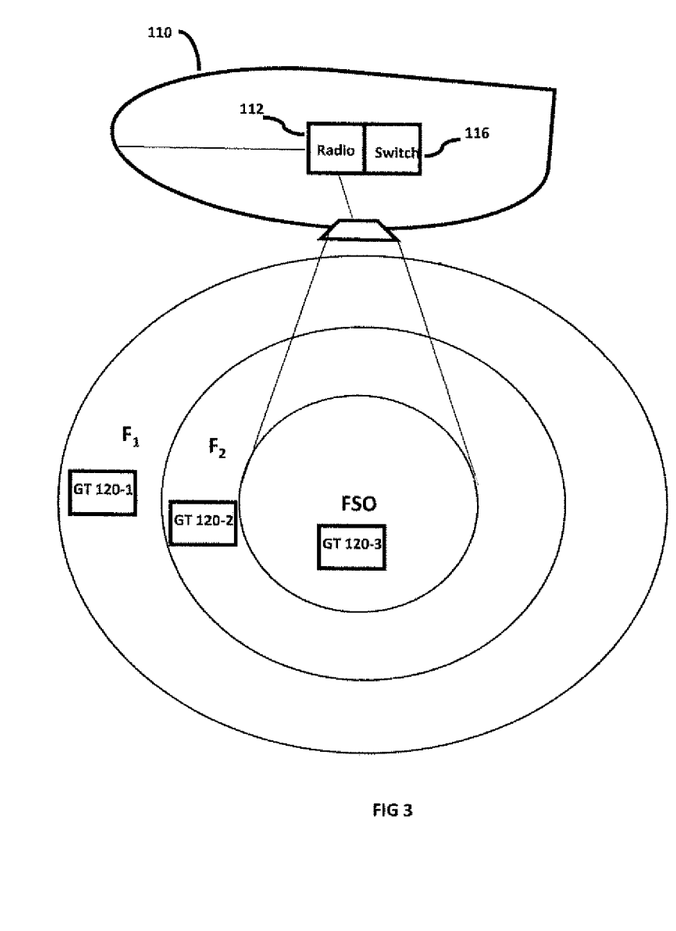
FIG. 3 is an exemplary diagram of drone based broadband access system using multiple transmission media to provide coverage to an area.

FIG. 3 shows an exemplary embodiment where two frequency bands $F_1$ and $F_2$ and FSO are used by the drone 110 and the GTs 120. The coverage area in the footprint of the drone 110 is divided into a number of rings. The innermost ring that is served by all frequency bands as well as FSO has the smallest range. The next two rings shown in FIG. 3 may be too far for FSO to reliably reach. As shown in FIG. 3, frequency band F1 has the largest coverage ring. In one embodiment, $F_1$ has a lower frequency than $F_2$; alternatively, the frequency band $F_1$ may be configured with a higher EIRP (Effective Isotopic Radiated Power) than $F_2$. GTs 120 in the outermost ring of the coverage area would be served using the $F_1$ frequency band, GTs 120 in the ring in the middle would be served using either $F_1$ or $F_2$ spectrum, and GTs 120 that are in the innermost ring could be served using $F_1$, $F_2$ or FSO. Note that more than two frequency bands may be used by the drone 110 and GTs 120 and the embodiments described in this disclosure extend to any number of frequency bands and/or FSO, etc.

In one implementation, rain fade may be mitigated by allocating enough link margin in the link budget for the different frequency bands based on their fading characteristics. In some cases, relying on allocating adequate link margin to mitigate rain or other atmospheric effects may be undesirable (e.g., where desired reliability would require excessive amounts of margin, etc.) Below, additional exemplary techniques are described to reduce the amount of link margin needed to mitigate rain and other atmospheric effects.

In one aspect of this disclosure, the drone 110 and GT radio sub-systems 122 measure a signal quality metric, such as SINR (Signal to Interference plus Noise Ratio), from the received messages from GTs (such as GTs 222, 232, and 212 shown in FIG. 1). The data rate from/to the drone 110 is adjusted according to the measured SINR. If the SINR received at a drone 110 or at a GT 120 degrades due to rain fade, resulting in a reduction in the data rate between the drone 110 and the GT 120, then in one exemplary implementation the degradation may be remedied by allocating more time slots or more frequency to the specific affected GT 120 to compensate for the lower data rate on the corresponding link. Suppose, for example, that the data rate between the drone and a specific GT 120 is reduced by a factor of four (4) due to rain fade. If four (4) times the number of time slots is allocated to the impacted GT 120, then the overall throughput the GT 120 experiences is the same as without any rain fade. In one variant, if more time is allocated to a GT 120 in rain fade, then at least some time is taken from other GTs 120. However, if only a small fraction of GTs 120 in the footprint of a drone 110 are impacted by atmospheric related fade, then taking time slots from other GTs 120 and allocating more time slots to the GT 120 in fade will reduce the throughput of the GTs 120 by a very small amount. The foregoing exemplary scheme (adjusting the number of time slots assigned to each GT 120 according to the data rate between the GT 120 and the drone) aims to equalize the throughput between different GTs 120 which have been assigned the same grade of service in terms of throughput. Those of ordinary skill in the related arts, given the contents of the present disclosure, will readily appreciate that similar schemes may be implemented based on e.g., frequency, spreading factors, etc.

Figure 4:
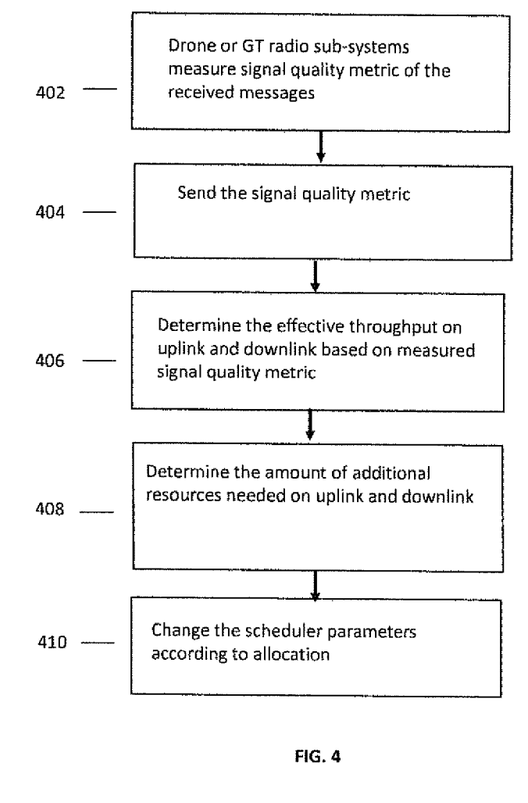
FIG. 4 is a flow chart illustrating an exemplary process to adjust one or more data rates on the links between terminals and the drone in response to rain or other atmospheric conditions.

FIG. 4 describes a flow chart of the exemplary scheme used to adjust the amount of time allocated to the link between a GT 120 and a drone 110 in response to rain or other atmospheric effects. In step 402, the drone 110 or GT radio sub-system 122 measures a signal quality metric (such as SINR) based on the received messages. Common examples of quality metrics may include without limitation: Received Signal Strength Indication (RSSI), Signal to Noise Ratio (SNR), Bit Error Rate (BER), Packet Error Rate (PER), Block Error Rate (BLER), etc. In one embodiment, the drone 110 or GT radio sub-system 122 monitors a change in the SINR between the received messages.

The changes in signal quality metrics may be monitored continually between the received messages and/or at periodic intervals. In one implementation, the periodic intervals may be dynamically changed. The periodic interval may be based on a current measurements and/or an amount of change between measurements (between messages and/or over a time period). For example, signal quality measurements may be provided at different intervals based on how quickly the signal quality changes. A rapidly fading channel requires faster updates, whereas a relatively stable radio link can provide less frequent updates.

In still other embodiments, the signal quality metrics may be polled or otherwise provided as requested. For example, in certain situations the drone 110 or GT 120 may be queried, and the resulting collection of measurements may be used for e.g., network optimization, initial deployment coverage assessment, handover assessment, redundancy coverage assessment, etc.

In step 404, the GT radio sub-system 122 sends the signal quality metric on the uplink to the drone radio sub-system 112. In one embodiment, the measured signal quality metric may be sent on the uplink on a periodic basis to the drone radio sub-system 112 or sent when the measured signal quality metric exceeds one or more threshold values. In one implementation, the measured signal quality metric comprises the measured SINR of one or more previously received messages. In another variant, the measured signal quality metric comprises a running average of SINR over multiple received messages.

In other embodiments, the drone radio sub-system 112 sends the signal quality metric on the downlink to the GT radio sub-system 122. Similarly, the measured signal quality metric may be sent on the downlink on a periodic basis to the GT radio sub-system 122 or sent when the measured signal quality metric exceeds one or more threshold values.

In step 406, the drone radio sub-system 112 or GT radio subsystem 122 determines the effective performance that the GT 120 or drone 110 will receive (or can be expected to receive), based on the measured signal quality. Common examples of performance may include e.g., the amount of data (e.g., throughput), the delay in data (e.g., latency), retransmission metrics, predicted BER (or PER, BLER), etc. By determining the effective performance, the drone radio sub-system 112 or GT radio subsystem 122 can determine whether the radio link is adversely impacted by atmospheric effects.

In some embodiments, the drone radio sub-system 112 or GT radio subsystem 122 may additionally consider other factors in addition to effective performance. For example, such factors may include e.g., historic performance (e.g., based on time of day and/or position), the rate of change of performance (e.g., to detect impending fast fading), known network traffic demands (e.g., peak hour demands, etc.)

In step 408, the drone radio sub-system 112 or GT radio subsystem 122 determines the amount of additional resources that must be allocated to the radio link. For example, a drone radio sub-system 112 may mitigate atmospheric effects in order to provide a similar grade of service for an impacted GT 120 as other GTs 120 with the same promised grade of service.

Those of ordinary skill in the related arts will readily appreciate that "resources" are broadly used to refer to any physical or virtual element of limited availability within the network. Common examples of resources include e.g., time slots, frequency bands, spreading codes, bandwidth, transmission power, etc. In one embodiment, the additional resources are allocated using one or more fairness criterion. In one implementation, fairness criterion refers to the scheme for allocating an amount of resources to different terminals. One exemplary fairness criterion, referred to as "equal grade of service" scheduling, attempts to provide the same average throughput to all terminals. To achieve equal grade of service more time is allocated to terminals that have lower signal quality and/or which receive data at lower data rates. Another exemplary fairness criterion referred to as "equal grade of time" scheduling allocates the same amount of time to multiple GTs 120. In equal grade of time scheduling, different GTs 120 will receive different average data throughputs commensurate with their received signal quality.

In some implementations, the allocation can take effect immediately. Alternatively, in some implementations, an appropriate time for the allocation to take effect must be determined. For example, in some instances, the radio link between the drone and/or GT is subject to broader network or usage considerations such as e.g., network traffic, neighboring interference and/or other radio links, etc. Under such conditions, the drone and/or GT must coordinate the allocation so as to e.g., minimize impact on neighbors, or optimize overall benefits gained.

In step 410, the drone radio sub-system 112 or GT radio subsystem 122 changes the scheduler parameters that determine how many resources are allocated to each GT 120. Responsively, the communication between the drone 110 and each GT 120 is configured in accordance with the scheduled parameters, and thereafter the allocation can take effect. In some embodiments the allocation change may occur at e.g., a prescribed effective time (e.g., via a time stamp), at a predetermined time (e.g., at the start of the next cycle, frame, etc.), responsive to a trigger event (such as signaling), etc.

While the foregoing example is presented with respect to a drone radio sub-system 112 and a GT radio subsystem 122, the concepts described therein can be generalized to a network of multiple drones and/or GTs. Moreover, it should be further appreciated by those of ordinary skill in the related arts given the contents of the present disclosure, that various steps of the method may be performed by other entities; for example, an evaluation of fairness criterion may be performed by a drone or GT network controller, etc.

Another exemplary method may mitigate atmospheric fade by switching a ten final that is operating at a higher frequency band to a lower frequency band. As previously noted, different frequency bands have different susceptibility to atmospheric effects. For example, a terminal using the higher frequency $F_2$ that is experiencing excessive rain fade is configured to switch to a lower frequency band $F_1$ (or another frequency with more rain fade margin). The GT radio sub-system 122 makes measurements of a signal quality metric such as SINR (Signal to Interference plus Noise Ratio) on the received messages from the drone 110 and reports the measured SINR or another signal quality to the drone radio sub-system 112. In one implementation, if the measured SINR falls below a certain threshold, then the drone radio sub-system 112 may initiate switching the communication link to the second frequency band $F_1$ by sending a message configured to inform the GT 120, of the switch to the alternative frequency. Since the second frequency incurs less rain fade, the link quality will improve by switching to a second frequency. Note that the drone radio sub-system 112 may also decide to switch the operating frequency to a second frequency based on the SINR or another signal quality metric measurement at the drone receiver. Similarly, with regards to FSO which suffers from fog and clouds, the system will switch from FSO to a radio frequency mode, $F_1$ or $F_2$ when the fade in FSO mode is excessive. This hybrid drone radio sub-system construction allows use of multiple transmission media in order to provide high throughput, and at the same time optimizes the use of each medium according to the rain and other atmospheric conditions. Note that switching the GTs 120 to the medium that has the least rain/atmospheric loss at a given time also allows the system to maximize the overall system throughput.

Figure 5:
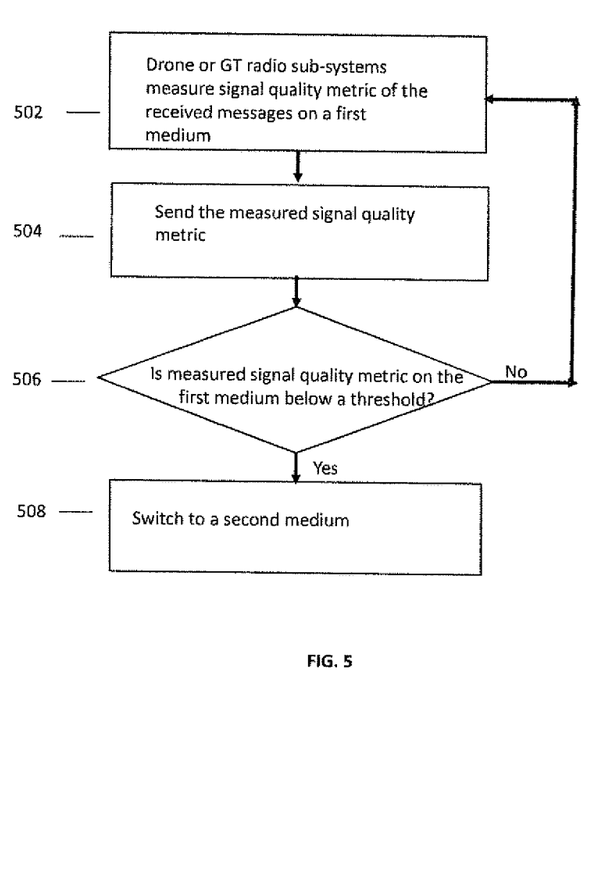
FIG. 5 is a flow chart of an exemplary process to switch a transmission medium between a drone and a terminal to mitigate fading due to e.g., atmospheric conditions such as rain, fog, and/or clouds.

FIG. 5 is a flow chart of an exemplary mechanism useful for detecting rain and other atmospheric fades, and to switch the transmission medium to a second medium. In step 502, the drone radio sub-system 112 or GT radio subsystem 122 measures a signal quality metric, such as SINR. The signal quality metric is measured from one or more communications between the drone and the GT. The measured signal quality metric may be measured from one or more particular types of received messages. Alternatively, the signal quality metric may be measured on any message received at a determined periodic interval. The periodic interval may be set as a predetermined time or may be configured to dynamically change based on one or more parameters. In one such implementation, the periodic interval is changed based at least in part on the measured signal quality metric.

In step 504, the measured signal quality metric is reported to the drone radio sub-system 112 or GT radio subsystem 122. The reported measured signal quality metric may comprise a measurement of a particular communication itself or may comprise a change in a measured signal quality metric. The GT radio sub-system 122 may be configured to report the measured SINR on a periodic basis, reported upon the measured SINR exceed a threshold, or a combination of both. In one implementation, the periodic basis is configured to dynamically change based at least in part on the value of the measured and/or reported SINR.

In step 506, the drone radio sub-system 112 or GT radio subsystem 122 determines whether the measured signal quality metric is below a certain threshold indicating excessive fade due to rain, fog, cloud or other effects. If the measured signal quality metric is below a threshold then the drone radio sub-system 112 or GT radio subsystem 122 switches the transmission medium to an alternate transmission medium (e.g., from $F_2$ to $F_1$, or from FSO to a radio frequency mode, $F_1$ or $F_2$). In some embodiments, the drone radio sub-system 112 or GT radio subsystem 122 requests that the transmission medium be switched (causing another supervisory entity to responsively perform the switch). For example, the drone radio subsystem 112 may decide to request a transmission medium change based on uplink SINR measurements at the drone receiver. Alternatively, the GT radio subsystem 122 may request a switch of the transmission medium based on the downlink SINR measurement by sending a message to the drone 110 with information on the new transmission medium and the time to switch to the new medium. One exemplary benefit of having the drone 110 decide when to switch transmission medium, as shown in FIG. 5, is that the drone may have information on all traffic and thus may be better suited to schedule GTs 120 on different media, while balancing the traffic among different media. It is appreciated however, that in GT initiated embodiments, the GT 120 may have information which the drone 110 may not be aware of (e.g., application requirements, etc.) In still other embodiments, a core network entity may manage connectivity, handovers, etc.

Another aspect of the present disclosure is the use power control to mitigate effects of atmospheric fade on the downlink. In one exemplary embodiment of the drone radio and transmission medium fixture design, the drone radio sub-system 112 and each antenna aperture for each frequency generate multiple beams to different GTs 120. The total power transmitted by an antenna aperture is configured to be sharable among the multiple beams formed toward different GTs 120. The GTs 120 served by a drone 110 may be located in a wide geographic area where all GTs 120 are not simultaneously affected by e.g., rain. When some GTs 120 experience atmospheric fade, the drone radio sub-system 112 may allocate more power to the downlink on the beam toward the affected GT 120. The GT radio sub-system 122 measures SINR received on the downlink pilot signals and reports the measured values to the drone 110 in signaling messages sent to the drone 110 on the uplink. The drone radio sub-system 112 determines the amount of rain fade based on the expected SINR values in absence of rain. The drone radio sub-system 112 then may increase the power allocated to the downlink of the affected GTs 120 (i.e., whose received SINR have decreased due to rain fade). Note that even in the power control scheme just described, in one exemplary implementation, certain power margins are allocated in the link budget of the downlink from the drone 110 in order to compensate for rain fade. However, using power control and allocating more power only on the downlink beams to GTs 120 in rain fade, the rain fade margin in effect is shared among different GTs 120, and therefore may result in less link margin being allocated to rain fade as compared to a scheme where each downlink is allocated its own dedicated rain fade margin. The power control based rain fade mitigation scheme, therefore, may significantly reduce the required rain fade margin, thereby resulting in a more efficient system. The above mentioned exemplary power control based rain fade mitigation scheme may increase effectiveness in streaming services where the traffic mainly flows on the downlink to the terminal.

Figure 6:
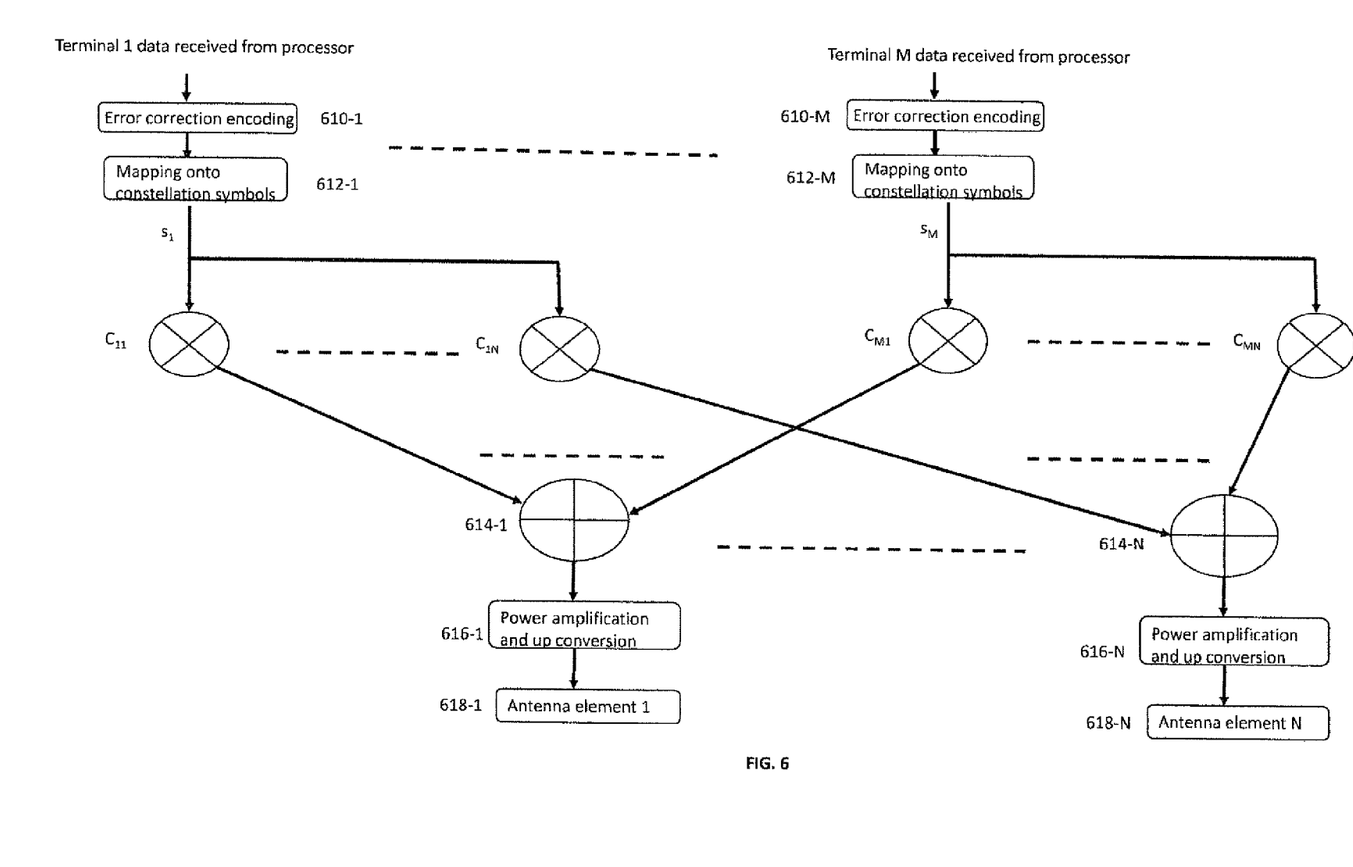
FIG. 6 is a block diagram of an exemplary apparatus configured to control transmission power on one or more downlinks to different terminals and further configured to form beams toward the one or more different terminals.

FIG. 6 is a block diagram of an exemplary modulation and power control sub-system for the transmitter (TX) unit of FIGS. 2A and 2B. In one embodiment, the parameters of FIG. 6 are configured such that antenna beams are formed simultaneously toward as many as M terminals using an antenna aperture comprised of N antenna elements. Those of ordinary skill in the related arts, given the contents of the present disclosure, will readily appreciate that other antenna configurations may be used, the foregoing configuration being purely illustrative. The data for the j-th terminal is encoded using error correction coding block 610-$j$, and then mapped onto constellation symbols in block 612-$j$, as shown for terminals 1 and M. Coded data symbols for the j-th terminal, denoted by $S_j$, are scaled by coefficients $C_{jk}$ where k is the index of the antenna element. Coefficients $C_{jk}$ are designed to form beams toward each terminal. The scaled symbols from different terminals that are destined to the same antenna element are then summed using the summing device 614-$k$, where k is the index of the summer corresponding to the k-th antenna element. The output of the summer 614-$k$ is then amplified and up converted using block 616-$k$ and then sent to antenna element 618-$k$.

Figure 7:
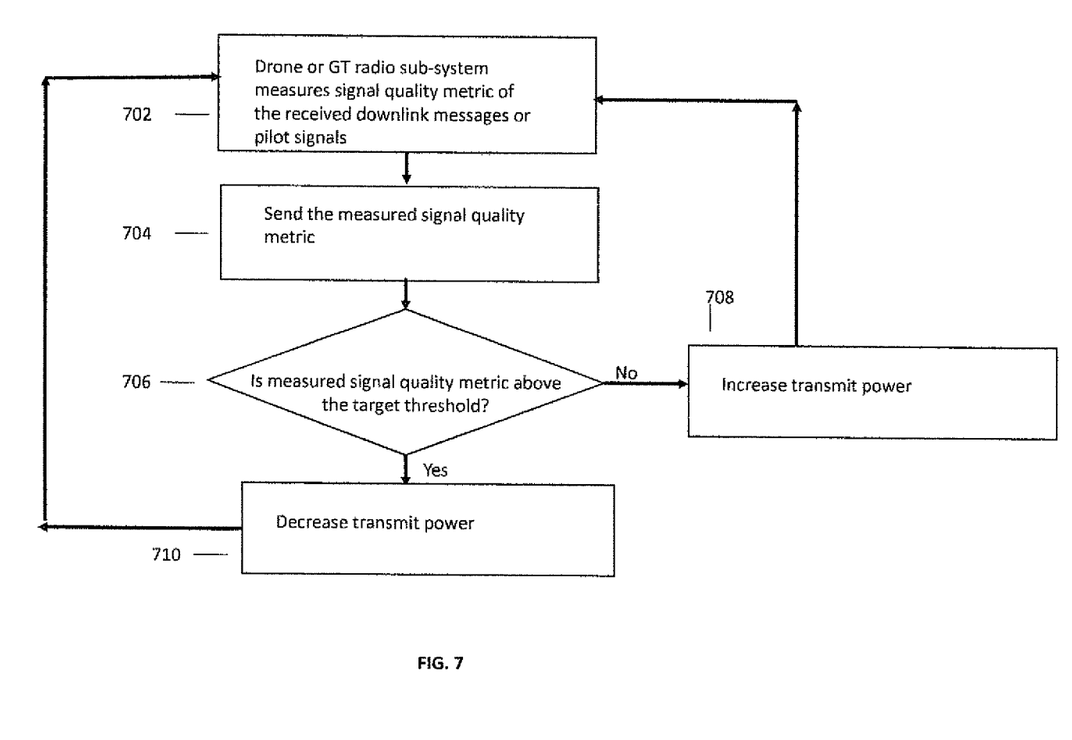
FIG. 7 is a flow chart of an exemplary process to adjust power transmitted on one or more downlinks to one or more different terminals in response to changes in atmospheric conditions such as, e.g., rain, fog, and/or clouds.

FIG. 7 is a flow chart of an exemplary power control based mechanism to mitigate rain fade. In step 702, the GT radio sub-system 122 measures received SINR or some other signal quality metric from the pilot signals on the downlink. In step 704, the GT radio sub-system 122 sends the measured SINR to the drone radio sub-system 112 in a message on the uplink. In step 706, the drone radio sub-system 112 compares the received SINR measurement from the GT 120 against a target SINR. If the measured SINR is smaller than the target, then in step 708 the drone radio sub-system 112 increases the power on the downlink to the specified GT 120. If the measured SINR is above the target, then in step 710 the drone radio sub-system 112 decreases the power on the downlink to the specified GT 120.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

What is claimed is:

1. A drone configured to provide broadband access to one or more terminals, the drone comprising:
   at least one transmission medium fixture configured to transmit on at least one transmission medium to provide coverage to one or more terminals;
   at least one radio sub-system configured to:
      demodulate and decode one or more first signals received from the one or more terminals; and
      modulate and transmit one or more second signals to the one or more terminals;
   and
   a drone switching sub-system configured to:
      switch data received at the drone to another receiving unit of the one or more terminals and/or one or more drones;
      determine a specified time to switch to a second transmission medium on a downlink for at least one of the one or more terminals with less fading due to atmospheric conditions;
      send information about the second transmission medium and the specified time to switch the downlink to the second transmission medium for the at least one terminal, the information configured to cause the at least one terminal to switch to the second medium on the downlink at the specified time; and
      switch to the second transmission medium on the downlink at the specified time.

2. The drone of claim 1, wherein:
   the one or more terminals comprise one or more ground-based mobile terminals;
   the at least one radio sub-system is further configured to determine a first amount of first transmission resources to be allocated to one or more downlinks of the one or more ground-based mobile terminals to equalize downlink data rates among the one or more ground-based mobile terminals according to a fairness criterion; and
   the drone switching sub-system further comprises a scheduler, the scheduler configured to schedule the determined first amount of transmission resources to the one or more downlinks of the one or more ground-based mobile terminals.

3. The drone of claim 2, wherein the at least one radio sub-system is further configured to:
   determine a change on an uplink signal quality received from the one or more ground-based mobile terminals due to one or more atmospheric conditions; and
   determine a second amount of second transmission resources to be allocated to one or more uplinks of the one or more ground-based mobile terminals to equalize an uplink data rate among the one or more ground-based mobile terminals according to at least one other fairness criterion; and
   wherein the scheduler is further configured to:
   schedule the determined second amount of transmission resources to the one or more uplinks of the one or more ground-based mobile terminals; and
   inform the one or more ground-based mobile terminals of respective scheduled transmission resources.

4. The drone of claim 1, wherein the at least one radio sub-system is further configured to:
   determine a change in amounts of power allocated on one or more downlinks of the one or more ground-based mobile terminals to equalize downlink data rates among the one or more ground-based mobile terminals according to a fairness criterion; and
   adjust one or more of the amounts of power allocated to various ones of the one or more downlinks of the one or more ground-based mobile terminals.

5. The drone of claim 4, wherein the at least one radio sub-system is further configured to:
   encode terminal data;
   map the terminal data onto constellation symbols;
   scale the constellation symbols from each terminal destined to different antenna elements to form a beam toward respective terminals of one or more different terminals;
   sum the scaled constellation symbols for the one or more different terminals destined to a same antenna aperture to form multiple beams, one toward each of the respective terminals;
   modulate the summed scaled constellation symbols onto a certain frequency to at least one transmission medium; and
   transmit the summed scaled constellation symbols through the same antenna aperture.

6. The drone of claim 5, wherein the at least one radio sub-system is further configured to choose the scale for the constellation symbols for each terminal to adjust the power sent to the each terminal.

7. A mobile terminal, comprising:
   a processor;
   a mobile terminal radio sub-system comprising at least one transmission medium fixture configured for use with at least two transmission mediums; and
   a non-transitory computer readable medium comprising one or more instructions which when executed by the processor, causes the mobile terminal to:

demodulate and decode one or more first signals received on at least one transmission medium of the at least two transmission mediums from at least one of one or more drones;

modulate and transmit one or more second signals on the at least one transmission medium to the at least one of the one or more drones; receive a switch instruction, over a current transmission medium, from at least one drone, the switch instruction comprising one or more specified times to switch to a different transmission medium for transmission to the at least one drone; and wherein the at least one transmission medium fixture switches to the different transmission medium at the one or more specified times, responsive to the switch instruction.

8. The mobile terminal of claim 7, wherein the non-transitory computer readable medium further comprises one or more instructions which when executed by the processor, causes the mobile terminal to:

measure a downlink signal quality affected by atmospheric conditions; and send the measured downlink signal quality to at least one radio sub-system of the one or more drones.

9. The mobile terminal of claim 7, wherein the non-transitory computer readable medium further comprises one or more instructions which when executed by the processor, causes the mobile terminal to:

measure a change in a downlink signal quality due to atmospheric conditions; and send the measured change in the downlink signal quality to at least one radio sub-system of the one or more drones.

10. The mobile terminal of claim 9, wherein the non-transitory computer readable medium further comprises one or more instructions which when executed by the processor, causes the mobile terminal to send the measured change in the downlink signal quality on a periodic basis.

11. The mobile terminal of claim 9, wherein the non-transitory computer readable medium further comprises one or more instructions which when executed by the processor, causes the mobile terminal to send the measured change in the downlink signal quality when the downlink signal quality exceeds one or more threshold values.

12. The mobile terminal of claim 7, wherein the non-transitory computer readable medium further comprises one or more instructions which when executed by the processor, causes the mobile terminal to:

receive a schedule of transmission resources to use for communication with at least one drone; and communicate with the at least one drone based on the received schedule.

13. The mobile terminal of claim 7, wherein the non-transitory computer readable medium further comprises one or more instructions which when executed by the processor, causes the mobile terminal to measure a downlink signal quality affected by atmospheric conditions; and wherein the measured signal quality comprises a signal to interference plus noise ratio (SINR).

14. A drone configured to provide broadband access to one or more terminals, the drone comprising:

at least one transmission medium fixture configured to transmit on at least one transmission medium to provide coverage to one or more terminals;

at least one radio sub-system configured to:

demodulate and decode one or more first signals received from the one or more terminals; and modulate and transmit one or more second signals to the one or more terminals;

and a drone switching sub-system configured to:

switch data received at the drone to another receiving unit of the one or more terminals and/or one or more drones;

measure a received uplink signal quality to determine a change in a signal quality due to one or more atmospheric conditions;

determine a specified time to switch to a second transmission medium on an uplink for at least one of the one or more terminals with less fading due to atmospheric conditions;

send information about the second transmission medium and the specified time to switch the uplink to the second transmission medium for the at least one terminal; and switch to the second transmission medium on the uplink at the specified time.

15. The drone of claim 14, wherein:

the one or more terminals comprise one or more ground-based mobile terminals;

the at least one radio sub-system is further configured to determine a first amount of first transmission resources to be allocated to one or more downlinks of the one or more ground-based mobile terminals to equalize downlink data rates among the one or more ground-based mobile terminals according to a fairness criterion; and the drone switching sub-system further comprises a scheduler, the scheduler configured to schedule the determined first amount of transmission resources to the one or more downlinks of the one or more ground-based mobile terminals.

16. The drone of claim 15, wherein the at least one radio sub-system is further configured to:

determine a change on an uplink signal quality received from the one or more ground-based mobile terminals due to one or more atmospheric conditions; and determine a second amount of second transmission resources to be allocated to one or more uplinks of the one or more ground-based mobile terminals to equalize an uplink data rate among the one or more ground-based mobile terminals according to at least one other fairness criterion; and the scheduler is further configured to:

schedule the determined second amount of transmission resources to the one or more uplinks of the one or more ground-based mobile terminals; and inform the one or more ground-based mobile terminals of respective scheduled transmission resources.

17. The drone of claim 14, wherein the at least one radio sub-system is further configured to:

determine a change in amounts of power allocated on one or more downlinks of the one or more ground-based mobile terminals to equalize downlink data rates among the one or more ground-based mobile terminals according to at least one fairness criterion; and adjust one or more of the amounts of power allocated to various ones of the downlinks of the one or more ground-based mobile terminals.

18. The drone of claim 17, wherein the at least one radio sub-system is further configured to:

encode terminal data;

map the terminal data onto constellation symbols;

scale the constellation symbols from each terminal destined to different antenna elements to form a beam toward respective terminals of one or more different terminals;

sum the scaled constellation symbols for the one or more different terminals destined to a same antenna aperture to form multiple beams, one toward each of the respective terminals;

modulate the summed scaled constellation symbols onto a certain frequency to at least one transmission medium and transmit the summed scaled constellation symbols through the same antenna aperture.

19. The drone of claim 18, wherein the at least one radio sub-system is further configured to choose the scale for the constellation symbols for each terminal to adjust the power sent to the each terminal.

20. The drone of claim 14, wherein the received uplink signal quality is measured on a periodic basis.

* * * * *